United States Patent Office 3,136,113
Patented June 9, 1964

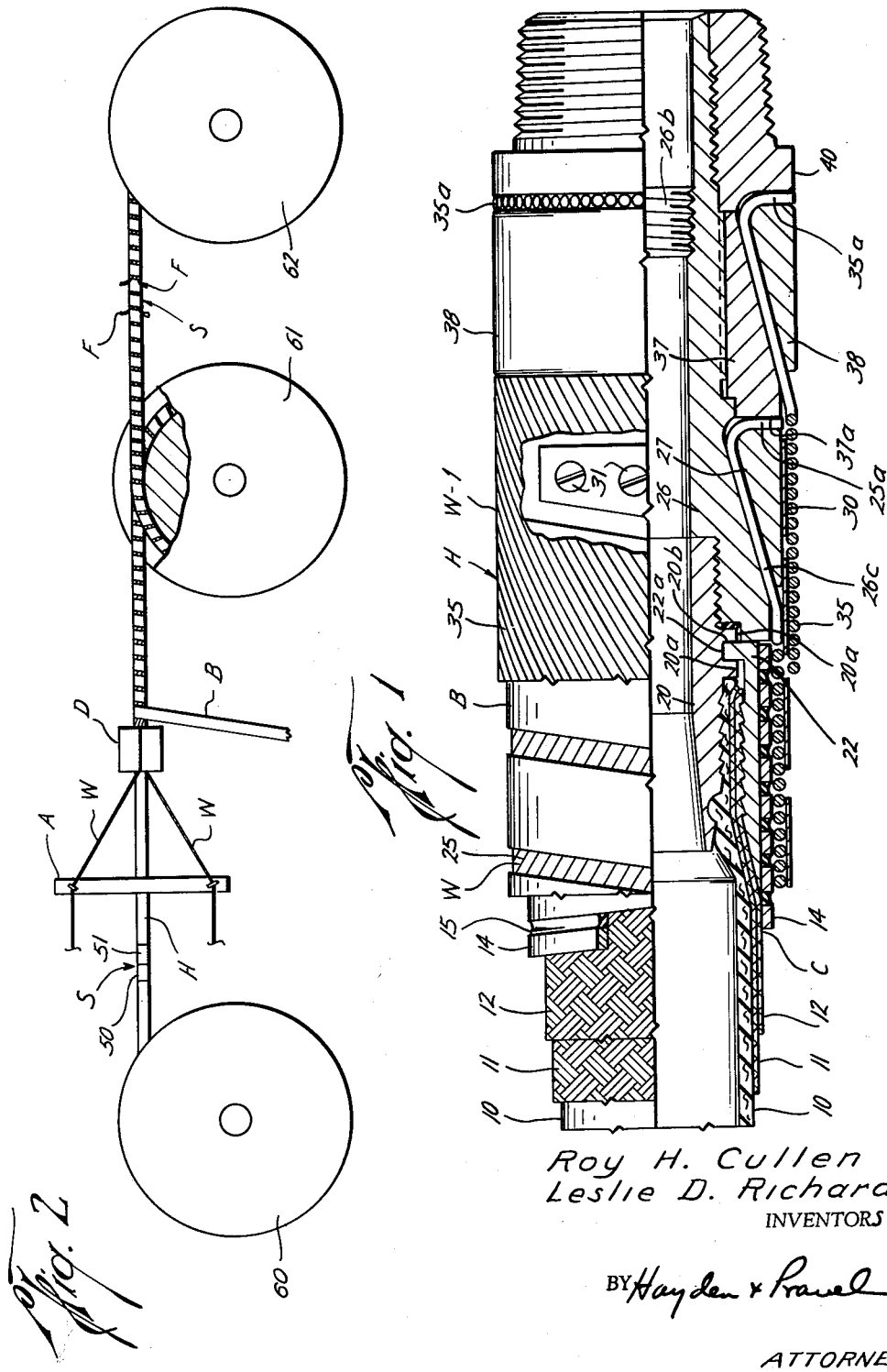

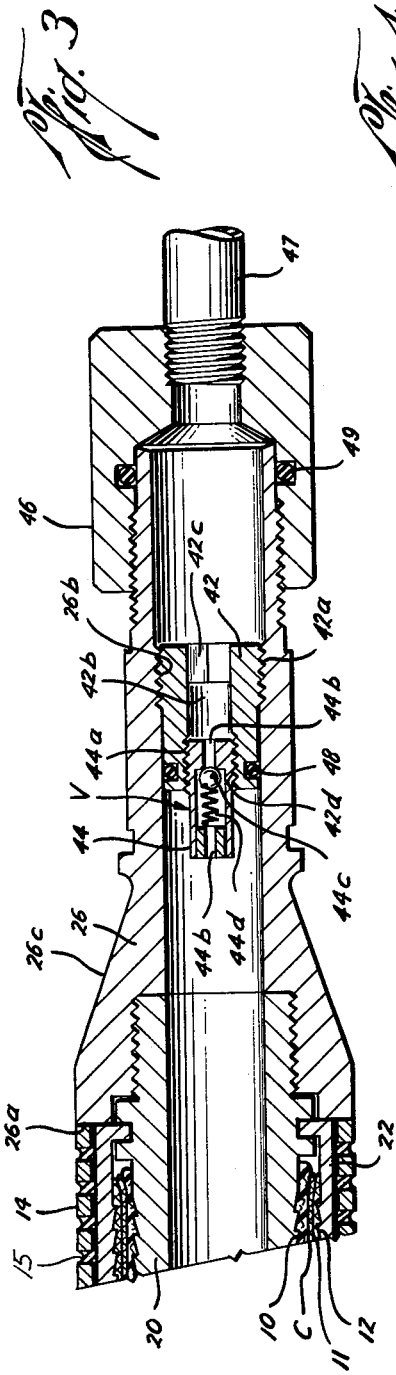
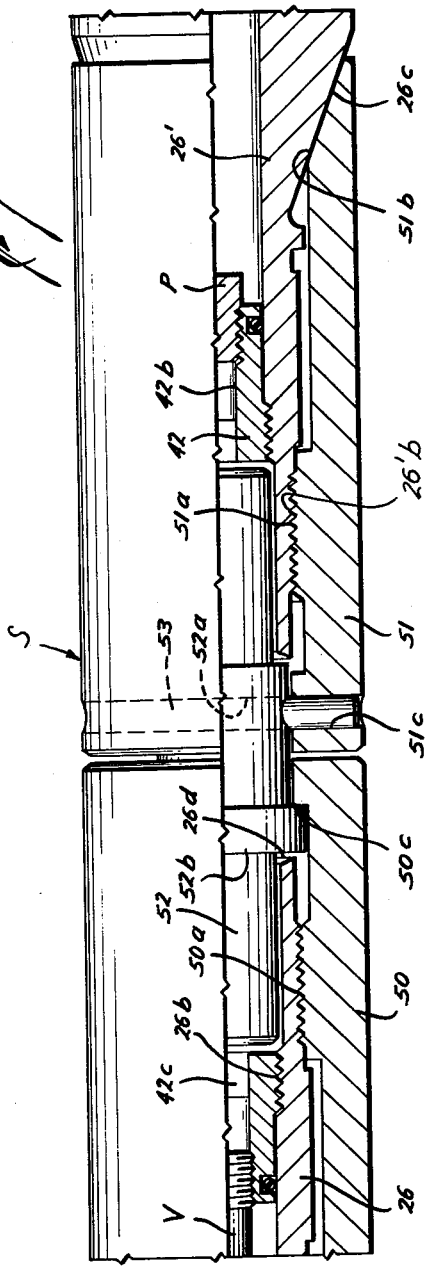
Roy H. Cullen
Leslie D. Richards
INVENTORS

3,136,113
METHOD OF MANUFACTURING WRAPPED PRESSURE HOSE
Roy H. Cullen, 1710 Texas Eastern Bldg., Houston 2, Tex., and Leslie D. Richards, Houston, Tex.; said Leslie D. Richards assignor to said Roy H. Cullen
Filed Apr. 6, 1962, Ser. No. 185,762
11 Claims. (Cl. 57—160)

This invention relates to new and useful improvements in method of manufacturing hose, and particularly wrapped pressure hose.

An object of this invention is to provide a new and improved method of manufacturing hose, wherein wire is wrapped on a hose core without twisting the hose to such an extent as to cause torsional collapse of the core.

An important object of this invention is to provide a new and improved method of forming a hose, wherein: a hose core is pressurized to cause a pre-shrinking thereof, such core is wrapped with a plurality of armor wires while in such pressurized condition, and the wires are secured at the ends of such core prior to the release of such pressure in the core, whereby the wires hold the core in the pre-shrunk condition.

A further object of this invention is to provide a new and improved method of forming a hose in which a core is wrapped with wire while the wire is under tension but while the core is under very little or substantially no tension, whereby a hose is provided having end pull strength and resistance to separation of the hose from its end couplings during use.

A particular object of this invention is to provide a new and improved method of manufacturing wire wrapped hose wherein a plurality of sections of hose core are releasably connected together with swivel connections at selected intervals to provide for relieving twisting and torsion developed during the wrapping of the wires on the core.

Another object of this invention is to provide a new and improved method of forming a wire wrapped hose in which a hose core is wrapped with wires in a helical direction, and such wires are restrained from unwinding by a band or tape surrounding the wires in an opposite helical direction.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section illustrating the final hose construction which is made by the method of this invention;

FIG. 2 is a view in elevation illustrating a portion of the method of this invention wherein wire is wrapped about the hose core;

FIG. 3 is a vertical sectional view of an end portion of one hose section illustrating the hose at an intermediate stage of construction with a valve mounted therein for introducing fluid pressure into the hose core to pressurize same; and FIG. 4 is a view, partly in elevation and partly in section, illustrating a means for connecting together the ends of adjacent sections of the hose while conducting the wrapping phase of the method of this invention.

Briefly, the method of this invention relates to the forming of a hose H (FIG. 1) by wrapping a wire or wires W on a hose core C. During such wrapping operation, the wires W are also wrapped with an outer band or tape B which is preferably flat and formed of a material such as steel. As will be more fully explained, the band B is wound in a direction which is opposite to the direction of the wrapping of the wire W and serves to prevent the untwisting or loosening of the wire or wires W when the tension on the wires W is released or relaxed. Also, according to the method of this invention, the hose core C is inflated or pressurized with fluid pressure to a pressure which is sufficient to pre-shrink the hose core C. By reason of such pressurizing, the hose core C is shortened to approximately the same extent as it is in use and is wrapped with the wire or wires W and the band B while in such pressurized condition. Therefore, as will be more evident hereinafter, such pre-shrinking prevents or inhibits separation or pulling of the hose core C from its end couplings during use.

Referring now to the invention in detail, the final hose construction H shown in FIG. 1 includes a hose core C which, as disclosed herein, includes an inner tubular conductor 10 made of rubber or similar flexible material and which is adapted to conduct fluids such as gas and liquid therethrough. For strength purposes, wire braid layers 11 and 12 are secured on the conductor 10 and also form a part of the hose core C. To provide crush-strength so as to prevent collapse of the conductor 10 when winding or coiling the hose H on a drum or similar device, helically wound steel spring 14 is positioned around the outer wire braid layer 12. Preferably, an elastomer 15 such as natural or synthetic rubber is positioned between the coils or wraps of the spring 14 by wiping or other suitable procedure. The inner tubular conductor 10 and the wire braid layers 11 and 12 are clamped between an inner nipple 20 and an outer ring 22, as will be explained. The spring 14 with the elastomer 15 is positioned externally of the ring 22 in the final position as shown in FIG. 1.

A plurality of wires W are helically wound, as will be explained, to form a layer 25 around the core C and externally of the spring 14. Such wires W are helically wrapped and they extend over a tubular body section 26 which is threaded or otherwise connected to the nipple 20. The ends of the wires W are secured to the body section 26 by any suitable means such as a tapered clamping ring 27 which is swaged into position over the ends of the layer of wires 25, as will be explained hereinafter.

The steel band or tape B which has previously been referred to above is wrapped or applied around the layer of wires 25 in a direction opposite to the direction in which such layer of wires 25 is wrapped. The end of the tape or band B shown in FIG. 1 at 30 is attached by screws 31 or is otherwise secured to the ring 27 at each end of each section of the hose so as to hold each end of the band B thereto. The opposite end of the band B from that shown in FIG. 1 would likewise be secured to the corresponding ring 27 at the other end of the hose H (not shown). Therefore, the wires W forming the layer of wires 25 and the restraining band B are secured at their ends to the end coupling members 26 and 27 in the final construction of the hose H.

A layer of wires 35 is positioned around the band B with the individual wires W-1 being laid helically in a direction opposite to the direction in which the wires W of the layer 25 are wrapped. The ends of the wires W-1 of the layer 35 are clamped between an annular locking sleeve 37 and a clamping ring 38. The annular ring 37 is mounted for longitudinal movement with respect to the body member 26 with interconnecting splines at 37 or other suitable means for preventing relative rotation between the sleeve 37 and the body 26. Also, the sleeve 37 preferably has an internal annular surface 37a which is in engagement with the upturned ends 25a on the layer of wires 25 as shown in FIG. 1 to serve to clamp such ends in contact with the ring 27. The ends 35a of the layer 35 are also bent upwardly and are confined by an outer retaining nut 40 which is threaded to the body member 26 in the preferred form of the invention.

In carrying out the method of this invention in its preferred form, the core C is first formed in any suitable manner. For example, the wire braid layers 11 and 12 may be woven over the inner conductor 10 or they may be slipped longitudinally onto the inner conductor 10. Thereafter, the spring 14 is longitudinally slipped over the outer wire braid layer 12. The spring 14 may be made up of a plurality of short lengths of spring which are slipped over the hose core C in succession to form the desired full length of the spring 14. Such positioning of the spring or springs 14 on each length of the hose core C may be facilitated by applying a longitudinal pulling force to the core C to reduce its diameter. Then, after the spring or springs 14 are in position on the core C, the pulling force may be relaxed so as to cause the hose core C to return to its original normal diameter and in close contact with the spring 14. It should be noted that the hose may be made of one continuous length or in shorter sections as desired. For hose used in oil well drilling, it has been found that sections of one hundred feet in length are desirable to facilitate replacement of damaged sections. Also, the solid couplings between the one-hundred foot sections provides a good surface for engagement by blowout preventers when this becomes necessary.

After the springs 14 are positioned on the core C, a nipple 20 is inserted in the end of each hose section, a swaging ring 22 is positioned over the ends of the conductor or tubular member 10 and the wire braid layers 11 and 12 externally of the nipple 20 and then the ring 22 is swaged into position. More specifically, the swaging ring 22 has an internal annular flange 22a the inner diameter of which is initially larger than the external diameter of the nipple 20 at the annular surface 20a so that the ring 22 can pass over the annular surface 20a and then be swaged into the annular groove 20b in the nipple 20 to the final position shown in FIGS. 1 and 3. When the swaging ring 22 is thus in its swaged position it firmly grips the hose conductor or tubular member 10 and the wire braid layers 11 and 12 between the nipple 20 and the ring 22. During such swaging, the spring 14 is pushed away from the ring 22, but after the ring 22 has been squeezed to the diameter shown in FIG. 1, the spring 14 slides longitudinally until the end thereof coincides approximately with the end of the ring 22 as shown in FIGS. 1 and 3.

The hose core C is then pressurized or inflated with fluid pressure, preferably using the type of apparatus illustrated in FIG. 3 and FIG. 4 of the drawings. In FIG. 3, the hose core C is illustrated as having been connected with the nipple 20 and the clamping ring 22 in the manner previously explained. The body member 26 is also connected to the nipple 20 so that its end 26a is in contact with, or substantially in contact with the adjacent end of the spring 14 and the ring 22, as shown in FIG. 3.

In order to mount a one-way valve V in the body member 26 for the pressurizing operation, the body member 26 is formed with internal threads 26b which are adapted to be engaged by corresponding threads 42a on a tubular insert 42. The tubular insert 42 has an internal bore 42b therethrough with flat wrench surfaces 42c formed in the outer end thereof to facilitate the threading of the insert 42 within the body member 26 to the position shown in FIG. 3. At the inner end of the insert 42, threads 42d are formed in the bore 42b for threaded engagement with corresponding threads 44a formed on a valve body 44. The valve body 44 has an opening 44b therethrough and a ball valve 44c is maintained in closing contact with the annular edge of the bore 44b by a spring 44d to maintain the bore 44b closed as shown in FIG. 3 until the pressure which is introduced from the right to the left as viewed in FIG. 3 is sufficient to force the ball 44 away from its seat in the bore 44b to permit the pressure to by-pass the ball 44c and flow into the interior of the body member 26 to the left of the valve V. When the pressure subsides sufficiently for the spring 44d to return the ball 44c to its seated position, the valve V is then closed again to maintain the pressure within the body member 26 and the core C. To maintain the pressure within the hose core C, the opposite end of the section of the hose core C is closed as will be explained hereinafter in connection with FIG. 4.

To facilitate the introduction of the fluid or air pressure into the hose core C through the valve V, an adaptor sleeve 46 is threaded on the exterior of the body member 26 as shown in FIG. 3. The adaptor sleeve 46 has a hose or tube 47 connected thereto by threads or any other suitable means and such hose or tube 47 is connected to any suitable source of water or suitable liquid under pressure (not shown). Seals 48 and 49 are provided to prevent the loss of the fluid pressure during the introduction of the pressure into the hose core C and also after the valve V has returned to its closed position. Such seals 48 and 49 are preferably rubber O rings or any other suitable sealing means.

As previously mentioned, at the opposite end of the hose core C from the end having the valve V therein, a closure or plug P is provided such as shown in FIG. 4. FIG. 4 illustrates a swivel connection S which temporarily connects adjacent ends of sections of hose core which have been pressurized so that there may be relative rotational movement between the hose sections during the wrapping of the wire or wires W thereon to relieve torque-torsion forces and twist, as will be more fully explained.

In FIGS. 3 and 4, the numeral 26 designates the body section which has the valve V therein at the time of the pressurizing or inflating of the hose core C. The body section 26' shown in FIG. 4 designates a body section or member which is identical in construction with the body member 26 except that it is at the opposite end of the hose section from the section 26 and it has the plug P therein at the time of the pressurizing or inflation of the hose core C.

In other words, with the body section 26 of FIG. 3 at the right-hand end of a section of the core C, the body section 26' would be at the left-hand end of such section of hose core C. All of the structure at the left-hand end of the hose core C would be the same except that the plug P shown in FIG. 4 would be threaded into the bore 42b of the insert 42 rather than the valve V. In that way, the left-hand end of the section of hose core C would be closed during the pressurizing or inflating of the hose core C. Of course, it will be understood that other types of means can be used for closing the end of each section of hose core C which is to be closed or plugged during the pressurizing or inflating step. Also, other types of valve means other than the valve V shown in FIG. 3 could be utilized so long as the pressure is introduced and is maintained therein after such introduction at the desired pressure. The left and right-hand ends of the hose core C and the parts connected thereto therefore would be identical during the inflating operation except for the plug P. Also, it will be understood that the adaptor 46 and the hose or tube 47 would not be connected to the body member 26' during the inflating operation.

After the inflating or pressurizing, the adaptor 46 and the hose or tube 47 are disconnected from the body member 26 of each section H which is being inflated or pressurized. If an elastomer 15 is to be applied to the helical spaces between the convolutions of the spring 14, the elastomer 15 is next wiped on with an annular wiper of any known construction so as to fill the helical spaces.

A tape, not shown, of any suitable material such as "Mylar" (polyethyleneterephthalate) may be used to cover the exterior of the elastomer 15 for retaining it in position during a curing operation. The pressure in the hose section is released by pushing the ball valve 44c inwardly with any suitable means such as a wire which is pushed through the opening 44b. After the pressure is released and the water or other liquid is drained out, a conventional curing operation is conducted to cure the elastomer 15.

Then, after cooling, each hose section H is again pressurized as explained above, which causes the hose to expand radially and shrink lengthwise to approximately the same extent as encountered in actual use when the hose is subjected to internal fluid pressure. Thus, the hose core C is pre-shrunk. It has been found that the water pressure for such pre-shrinking should be at about 1500 pounds/square inch, although it will be appreciated that less pre-shrinking may be employed if the hose is to be used normally for handling lower fluid pressures. When the hose sections H have thus been pre-shrunk, adjacent hose sections H are connected together by the swivel S shown in FIG. 4. Such swivel S includes swivel sleeves 50 and 51, an internal swivel member 52 and a swivel retaining pin 53. The swivel sleeve 51 is provided with threads 51a for threading the sleeve 51 on the body member 26'. To stabilize the swivel sleeve or coupling 51, it is provided with a tapered surface 51b which is adapted to engage the tapered surface 26c on the body member 26'. At the outer end of the swivel sleeve 51, a lateral opening 51c is provided through which the retaining pin 53 extends. Also, as will be more evident hereinafter, the swivel pin or member 52 has an opening 52a therethrough which is in alignment with the opening 51c and through which the retaining pin 53 also extends so as to lock the swivel member 52 to the sleeve 51 to prevent relative rotational movement therebetween. Also, upon the removal of the pin 53 from the sleeve 51 and the member 52, the member 52 may be removed from its position within the sleeve 51 and thereby disconnect the sleeve 50 and the sleeve 51 from each other for separating the adjacent ends of the adjacent sections of the hose core. The sleeve 50 is substantially the same as the sleeve 51 and its has a tapered surface corresponding to the tapered surface 51b, but it also has an internal annular flange 50c which is adapted to confine an annular flange 52b provided on the swivel member 52. The flange 52b is thus confined between the internal annular shoulder 50c on the swivel sleeve 50 and the end 26d on the body member 26 so that relative rotational movement between the member 52 and the sleeve 50 is permitted while preventing separation or longitudinal movement therebetween. It is to be noted that the sleeve 50 is secured to the body member 26 by the engagement of its threads 50a with the threads on the body 26 as shown in FIG. 4. Therefore, with the swivel construction shown in FIG. 4 the adjacent sections of the hose core are coupled together, but they are adaped to swivel relative to each other which avoids excessive twisting of the hose core C during the wrapping of the wire or wires W thereon, as will be more evident hereinafter.

With the plurality of the inflated hose sections H connected together with the swivels of the type shown in FIG. 4 or any other suitable type of swivels, such sections H are then mounted upon a supply or pay-off reel 60 (FIG. 2). The hose sections H are adapted to be fed from the reel 60 by a capstan 61 to a product reel 62.

During the wrapping operation, the reel 60 rotates freely as the hose is payed out therefrom, so that there is substantially no tension on the hose H during the wrapping of the wires W thereon. Tension in the hose H is avoided to prevent a stretching of the core C, which would tend to counteract the effect of the pre-shrinking with the internal fluid pressure. The wire or wires W are, however, under tension as they are wrapped helically on the hose core C by a conventional wire armoring machine A schematically shown in FIG. 2. Normally, there will be a large number, in the neighborhood of fifty, of the wires W wrapped to form the layer 25 shown in FIG. 1. The wires W pass from the armoring machine A to a pair of closing dies D, which together have a cylindrical bore fitting closely over the wires W to maintain them in a smooth lay as they form the layer 25.

During the wrapping operation, a torsion force is exerted on the core C by the wires W. Such torsion originates at the point where the wires W enter the closing dies D. Looking at the hose in FIG. 2 from the closing dies D to the right towards the capstan 61, the torsion force is acting in a left-hand (counterclockwise) direction which causes a slight twist in the hose as it slides and rolls into position on the capstan 61. However, such twisting does no damage to the hose because it cannot become cumulative and furthermore, it is later automatically relieved when each hose section is separated. However, there is a torsion or twist produced in the core C as viewed from the closing dies D to the left in FIG. 2 which would be cumulative and would not be relieved except for the presence of the swivels S between the hose sections H. The free swivel S indicated to the left of the closing dies D in FIG. 2 must feed off of the reel 60 before an accumulated twist results in torsional collapse of the inner core C. Thus, as the swivel S passes from the reel 61 to the dies D, the twist in the section H being wrapped is relieved by a rotation of the sleeve 51 relative to the sleeve 50 (FIG. 4). After each swivel S passes into the closing dies D, the wires W render that swivel inoperative, but it has served its purpose for the wrapping operation by that time.

In order to locate the wrapped swivel connections S at a later time when separating the sections H from each other, a piece of cloth or flagging F (FIG. 2) is manually enmeshed with the wires W as each swivel S passes through the armoring head A. A band or tape B of steel or similar material which is relatively wide as compared to the wires W is wrapped over the wires W just following the closing dies and in a helical direction opposite to the wrapping of the wires W. Such wrapping may be accomplished by hand, but normally would be accomplished with standard wrapping equipment.

After the plurality of sections H have been wrapped with the wire W and the band B, suitable clamping rings are placed around the band B and the wires W at the end of the last hose section H, the wires W and the band B are severed, and the fully wrapped hose is coiled on the reel 62. Thereafter, the hose is pulled off the reel 62 and clamping bands of any suitable construction (not shown) are clamped on each side of the center of each swivel S to temporarily hold the band B and wires W. Then, the wires W and the band B are cut at the center of the swivel connections between the sleeves 50 and 51. The swivels are then released to separate the sections H.

The clamping means is clamped around the band B at a point approximately over each clamping ring 22 (FIG. 1) so as to hold the wires W and the band B while permitting the band B to be laid back enough for the positioning of the ring 27 on the ends of the wires W. The swivel parts are then disconnected and removed so as to leave only the body members 26 and 26'. The valve V and plug P are preferably left in position until a later time, as explained hereinafter. Thereafter, the band B is laid back sufficiently to permit the positioning of the ends of the wires W on the tapered surface 26c of the body member 26 and then the ring 27 is swaged into position over the ends of the wires W, preferably in accordance with the procedure disclosed in United States patent application Serial No. 664,230, now Patent No. 3,004,779. After the clamping ring 27 is in position such as shown in FIG. 1 of the drawings, the band B is secured to the ring 27 by drive screws 31 (FIG. 1) or is otherwise secured thereto to prevent the wires W from unwinding or untwisting. The temporary clamping rings are removed after the ends of the band B are secured with the screws 31. By reason of the wrapping of the wires W and the band B on the sections H in opposite helical directions, and the subsequent securing of the ends of the wires W and the band B together at the end coupling for the hose H as explained in connection with FIG. 1, there is a restraining force provided by the band B which counteracts any tendency of the wires W to loosen or untwist. It is to be noted that both ends of the band B on each of the sections H are secured in the same manner as explained in connection with the end shown in FIG. 1 of the drawings.

Thereafter, the second layer of wires W-1 is wrapped helically in the same manner as previously explained in connection with the wires W, but in an opposite direction. An additional restraining band such as the restraining band B is not used over the wires W-1 since the connection of the wires W and the band B to the end couplings prevent the wires W-1 from untwisting or loosening. Also, the use of the water pressure inside of the hose sections is not necessary when applying the wires W-1 since the pre-shrinkage has already been built into the hose sections H, but the fluid pressure may be used to make the sections H more rigid and to prevent a creeping or bunching of the tape or band B. After the wires W-1 are wrapped, they are temporarily secured to the end couplings by a wire or other tie member extending around the wires W-1, preferably over the ring 27. Then the ring 37 is longitudinally slipped on the body member 26 so as to engage the ends of the wires 25a and so as to receive the ends of the wires W-1 thereon. The clamping ring 38 is then swaged over the ends of the wires W-1 and the end coupling 40 is threaded into position to clamp the ends 35a of the wires W-1 in layer 35 therebetween as shown in FIG. 1. The same procedure is used in the assembly of the wires W-1 on the other end of each of the sections of the hose H. By reason of the method of this invention wherein the restraining band B is used between the layers 25 and 35, an exterior covering is not needed to confine such layers.

The insert 42 with the valve V in the end of each body member 26 and the insert 42 with the plug P in the body member 26' are removed from each section of the hose H after the wires W-1 have been permanently secured to the end couplings. The hose sections H are then ready for use and as many sections H may be coupled together as desired with union-type couplings of any suitable construction (not shown).

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A method of manufacturing hose, comprising the steps of,
   (a) pressurizing the interior of a hose core to pre-shrink the same in length to substantially the same extent as the core is shortened by internal fluid pressure in use,
   (b) wrapping wire on the core while it is subjected to such pressurizing, and
   (c) securing the wire prior to the release of the pressure in the core so as to hold the core to the pre-shrunk length.

2. A method of manufacturing hose, comprising the steps of,
   (a) connecting together a plurality of hose core sections with swivel connections therebetween,
   (b) feeding said sections from a supply reel to a product reel,
   (c) wrapping wire around said core sections as said sections are being fed from the supply reel to the product reel, and
   (d) disposing the swivel connection for each section between the supply reel and the point of wrapping the wire to permit a relieving of twist and torsion forces created on the sections by the wrapping thereof with the wires, whereby torsional collapse of the sections is avoided.

3. A method of manufacturing hose, comprising the steps of,
   (a) connecting together a plurality of hose core sections with swivel connections therebetween,
   (b) feeding said sections from a supply reel to a product reel,
   (c) wrapping wire under tension helically around said core sections as said sections are being fed from the supply reel to the product reel,
   (d) disposing the swivel connection for each section between the supply reel and the point of wrapping the wire to permit a relieving of twist and torsion forces created on the sections by the wrapping thereof with the wires, whereby torsional collapse of the sections is avoided, and
   (e) laying a restraining band around said core sections in the opposite helical direction to the direction in which the wire is wrapped to prevent the wire from untwisting upon the release of the tension.

4. A method of manufacturing hose, comprising the steps of,
   (a) pressurizing the interior of a hose core having end fittings to pre-shunk the core in length,
   (b) thereafter wrapping wire around the hose core while said core is pre-shrunk and while applying tension to the wire but while the core is under substantially no tension, and
   (c) thereafter securing the wrapping wire to the end fittings to hold the core at its pre-shrunk length.

5. A method of manufacturing hose, comprising the steps of,
   (a) pressurizing the interior of a hose core to pre-shrink the same in length,
   (b) wrapping wire around the hose core while applying tension to the wire but while the core is under substantially no tension, and
   (c) applying a restraining band around the wrapped wire in the opposite direction to the direction in which the wire is wrapped to prevent the wire from untwisting upon the release of the tension.

6. A method of manufacturing hose, comprising the steps of,
   (a) connecting together a plurality of hose core sections,
   (b) coiling a portion of said core sections on a supply reel with another portion extending therefrom to a product reel,
   (c) wrapping wire around the hose core sections at a point between the supply reel and the product reel,
   (d) applying a restraining band around the wrapped wire, and
   (e) securing the wire and the band to the ends of each section to prevent the wire from untwisting.

7. A method of manufacturing hose, comprising the steps of,
   (a) wrapping wire around a hose core while said core is inflated,
   (b) applying a restraining band around the hose core in the opposite direction to the direction in which the wire is wrapped, and
   (c) connecting the wrapped wire and the restraining band to end couplings at the ends of the hose core prior to the deflation thereof, whereby the ends of the wire and the band are fixed against relative movement with respect to each other and the core is held to a pre-shrunk length.

8. A method of manufacturing hose, comprising the steps of,
(a) forming a core composed of an inner tubular conductor and an outer spring wound around the conductor,
(b) connecting end couplings to the core,
(c) applying an internal fluid pressure to said core, and
(d) wrapping wire around the core while the core is subjected to the internal fluid pressure.

9. A method of manufacturing hose, comprising the steps of,
(a) connecting together a plurality of hose core sections,
(b) wrapping wire around said core sections,
(c) laying a restraining band around said core sections in the opposite direction to the direction in which the wire is wrapped,
(d) temporarily connecting the wrapped wire and band to the ends of each core section,
(e) separating the core sections from each other, and
(f) then permanently joining the wrapped wire and band to the ends of each core section.

10. A method of manufacturing hose, comprising the steps of,
(a) pre-shrinking a hose core to shorten same in length, and
(b) thereafter wrapping wire around the hose core while said core is shortened in length.

11. A method of manufacturing hose, comprising the steps of,
(a) pre-shrinking a hose core to shorten same in length,
(b) wrapping wire around the hose core while said core is shortened in length, and
(c) securing the wire to only the ends of said core while said core is shortened in length so as to hold the core to the pre-shrunk length.

References Cited in the file of this patent
UNITED STATES PATENTS

| | | |
|---|---|---|
| 2,072,284 | Voorhees | Mar. 2, 1937 |
| 2,714,414 | De Ganahl et al. | Aug. 2, 1955 |
| 2,901,024 | Marsden | Aug. 25, 1959 |
| 2,918,777 | Reeve et al. | Dec. 29, 1959 |
| 3,020,701 | McCormick | Feb. 13, 1962 |
| 3,028,276 | Roberts et al. | Apr. 3, 1962 |
| 3,028,291 | Roberts et al. | Apr. 3, 1962 |
| 3,033,730 | Martin | May 8, 1962 |

FOREIGN PATENTS

| | | |
|---|---|---|
| 437,396 | Great Britain | Oct. 29, 1936 |